(12) United States Patent
Hansen et al.

(10) Patent No.: US 6,868,863 B2
(45) Date of Patent: Mar. 22, 2005

(54) PRESSURE REDUCTION VALVE

(75) Inventors: Poul Erik Hansen, Nordborg (DK); Svend Erik Thomsen, Nordborg (DK); Thorkild Christensen, Sonderborg (DK)

(73) Assignee: Sauer-Danfoss ApS (DK)

( * ) Notice: Subject to any disclaimer, the term of this patent is extended or adjusted under 35 U.S.C. 154(b) by 154 days.

(21) Appl. No.: 10/293,198

(22) Filed: Nov. 13, 2002

(65) Prior Publication Data

US 2003/0094202 A1 May 22, 2003

(30) Foreign Application Priority Data

Nov. 16, 2001 (DE) .......................................... 101 56 500

(51) Int. Cl.[7] .............................................. F16K 17/04
(52) U.S. Cl. .................................. 137/505.25; 137/505
(58) Field of Search .......................... 137/505, 505.25 I, 137/116.5

(56) References Cited

U.S. PATENT DOCUMENTS 2,755,815 A * 7/1956 Zaner ....................... 137/484.2
4,226,257 A * 10/1980 Trinkwalder ............... 137/81.2

* cited by examiner

Primary Examiner—Stephen M. Hepperle

(57) ABSTRACT

The invention concerns a pressure reduction valve (1) with a housing (2a, 2b), a valve element (6) being displaceable in the housing and acted upon in one direction by a pressure in a low-pressure chamber connected with an outlet (11) and in the opposite direction by the force of a spring (16), which is arranged in a spring chamber (17) in the housing (2a). It is endeavoured to improve the dynamic behaviour of the pressure reduction valve. For this purpose, a pilot flow path (7, 23, 21) connects the low-pressure chamber (5) and the spring chamber (17) with each other.

10 Claims, 1 Drawing Sheet

PRESSURE REDUCTION VALVE

BACKGROUND OF INVENTION

The invention concerns a pressure reduction valve with a housing, a valve element being displaceable in the housing and acted upon in one direction by a pressure in a low-pressure chamber connected with an outlet and in the opposite direction by the force of a spring, which is arranged in a spring chamber in the housing.

BACKGROUND OF THE INVENTION

Pressure reduction valves of this kind are commonly known. The valve element is made in the shape of a slide, which can be displaced in a bore in the housing against the force of a spring. The slide has a blind longitudinal bore, whose circumferential wall is provided with control openings. Depending on the position of the slide, these control openings are more or less overlapping a pressure supply opening in the wall of the housing. The blind longitudinal bore is part of the low-pressure chamber.

When the force on the slide generated by the pressure in the low-pressure chamber exceeds the force of the spring, the slide is displaced and thus closes the pressure supply opening more, so that inflowing fluid is more throttled. When, however, the pressure in the low-pressure chamber drops, the slide is displaced in the opposite direction by the force of the spring, so that the supply of fluid is less throttled, and accordingly a smaller pressure drop occurs.

Basically, such pressure reduction valves have proved their value. In many applications, however, it can be seen that the dynamic behaviour is not quite satisfactory. Particularly when suddenly large fluid amounts are required, the slide releases the pressure inlet opening too slowly.

Therefore, a principal object of this invention is to improve the dynamic behaviour of the pressure reduction valve.

A further object of this invention is to provide a pressure reduction valve with a pilot flow path connecting the low-pressure chamber and the spring chamber with each other.

These and other objects will be apparent to those skilled in the art.

SUMMARY OF THE INVENTION

Through a pilot flow path, the low-pressure chamber of the pressure reduction valve is supplied with fluid, so that the spring chamber is also filled with fluid in all operating states. In connection with a displacement of the valve element, the displacement or supply of the fluid to refill the spring chamber will play an insignificant role. The fluid in the spring chamber will not influence the movement behaviour of the valve element as much as earlier. The pressure building up in the spring chamber naturally acts upon the valve element. This must be considered when dimensioning the spring.

A throttling device is arranged in the pilot flow path. This throttling device has two advantages. Firstly, it throttles the fluid flow from the low-pressure chamber to the spring chamber, so that the fluid loss is reduced, when the fluid flows off from the spring chamber. Secondly, the throttling device improves the force action upon the valve element by means of the pressure ruling in the low-pressure chamber. The forces generated by the pressure difference over the throttling device, or a part of them, then act upon the valve element.

The pilot flow path has a branch, which is connected with a pressure sink. Thus, it is ensured that a liquid flow can currently flow from the low-pressure chamber to the spring chamber. Fluid that is not needed in the low-pressure chamber, because the low-pressure chamber is completely filled, will then flow off via the branch. This means that currently a certain amount of fluid is lost. However, this fluid loss can be accepted, as the dynamic behaviour of the pressure reduction valve is substantially improved. Additionally, suitable measures can help keep this fluid loss relatively small.

The throttling device forms a pressure divider, whose middle outlet is connected with the spring chamber. The pressure in the spring chamber then has a value between the pressure in the low-pressure chamber and a pressure at the pressure sink. This makes it easier to generate sufficient forces in the low-pressure chamber to displace the valve element. At the same time it is ensured that a sufficient amount of fluid under a certain pressure is available in the spring chamber, so that a displacement of the valve element causing an expansion or a reduction of the spring chamber will cause no problems with regard to displacement or refilling of fluid. Particularly during an expansion of the spring chamber also the problem with cavitation in the spring chamber is substantially reduced.

The pilot flow path runs through the valve element. This simplifies the design. Basically, housings can then be used, which have also been used for traditional pressure reduction valves. However, a modification of the valve element is required. Further, with this embodiment it is easier to provide the pilot flow path with substantially the same flow characteristic in all positions of the valve element.

The valve element has the form of a slide with an axial bore. The axial bore penetrates the slide in such a way that the fluid can travel from one end of the slide, where the low-pressure chamber is arranged, to the other end of the slide, where the spring chamber is arranged, and escape there. The production of an axial bore is relatively simple. Accordingly, it is possible to manufacture the valve element at low cost.

The throttling device has a throttling opening, which is made in a border wall of the axial bore. The throttling opening is part of the pressure divider. In the area of this throttling opening the housing has an annular groove, so that fluid escaping through the throttling opening can flow off.

It is particularly preferred that the throttling opening is made as a step bore. A selection of the length and the diameter of the individual steps enables a relatively accurate setting of the throttling effect of the throttling bore. Additionally, a step bore makes it possible to reduce the wall thickness separating the area with high pressure from an area with low pressure. The small physical distance between these two areas will reduce the temperature dependency.

The throttling device has a throttling insert, which is arranged in the pilot flow path. The throttling insert can easily be manufactured and checked outside the valve element, so that also here the throttling properties of the throttling insert and the throttle formed by it can be set very accurately.

The throttles of the throttling device have the same temperature dependency. Accordingly, the pressure reduction effect of the pressure reduction valve is only to a small extent dependent on the temperature.

The throttling device has a small temperature dependency. This can, for example, be achieved in that the throttles are made as sharp-edged apertures. Alternatively, for example, slot apertures can be used. The small temperature dependency of the throttles also causes a small temperature dependency of the pressure set by the pressure reduction valve.

The pilot flow path has an opening into the spring chamber, which is completely open in any position of the valve element. Thus, the passage of fluid into the spring chamber is not changed by the position of the valve element.

DESCRIPTION OF THE EMBODIMENTS OF THE INVENTION

Figure 1:
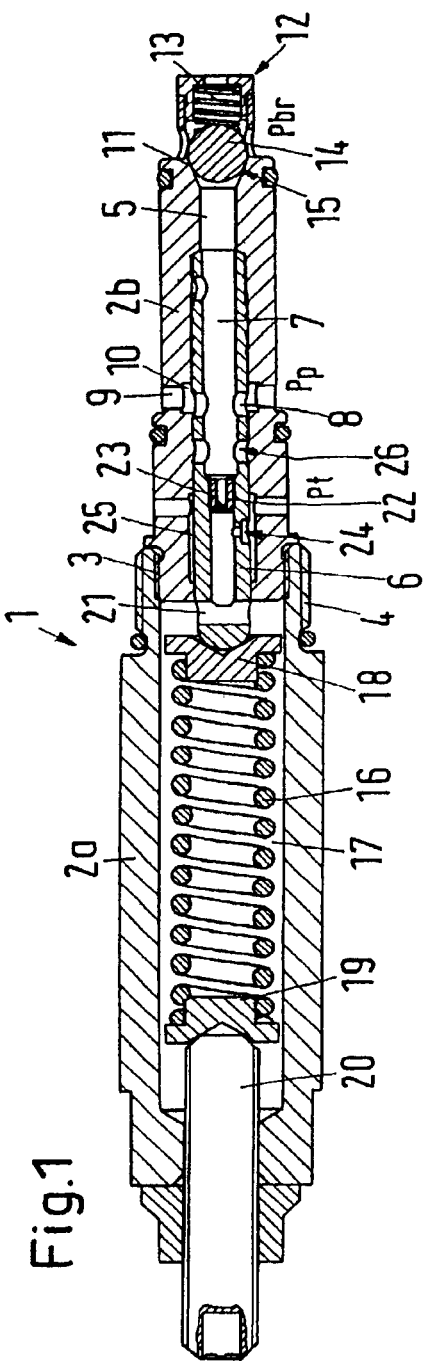
FIG. 1 is a schematic longitudinal section through a pressure reduction valve.

FIG. 1 shows a pressure reduction valve 1 having a two-part housing 2a, 2b, the two parts 2a, 2b being assembled by means of a screw thread 3. The housing part 2a has an external thread 4, with which the pressure reduction valve 1 can be fixed in a hydraulic arrangement (not shown in detail).

A low-pressure chamber 5 is provided in the housing part 2b, said chamber 5 being in the form of a stepped axial bore. In the low-pressure chamber 5 a slide 6 is displaceable in the axial direction. The slide 6 has an axial bore 7, which is open in the direction of the low-pressure chamber 5. In the wall of the slide 6, first openings 8 are provided, which extend substantially radially and, in the position shown, overlap pressure supply openings 9 in the housing part 2b, at which openings 9 a higher pressure Pp can rule. The pressure supply openings 9 may be connected with each other via an annular groove 10.

A non-return valve 12 is arranged in an outlet 11 of the low-pressure chamber 5 has. The non-return valve 12 has a spring 13, which presses a valve ball 14 against a valve seat 15, the valve ball 14 being liftable from the valve seat 15 against the force of the spring 13 by fluid flowing out of the low-pressure chamber 5.

In a spring chamber 17 in the housing part 2b is arranged a spring 16, which acts upon the slide 6 by way of a pressure plate 18, or rather upon the end of the slide 6, which is opposite to the low-pressure chamber 5. The other end of the spring 16 is supported on supporting plate 19, whose position in the housing part can be changed by means of screw spindle 20. This means that screwing the screwing spindle in or out can change the preload of the spring 16 and thus also the pressure Pbr, at which the pressure in the low-pressure chamber 5 must be set.

At the end of the slide 6, which projects into the spring chamber 17, the axial bore 7 in the slide 6 ends in a transverse bore 21. Thus, the axial bore 7 and the lateral bore 21 ensure a constant connection of the low-pressure chamber 5 and the spring chamber 17.

A throttle 23, which can, for example, be screwed into the slide 6, is arranged in a throttling insert 22 in the axial bore 7. Between the throttling insert 22 and the spring chamber 17, a throttling bore 24, here in the form of a step bore, is provided in the wall of the slide 6. In any position of the slide 6 in the housing part 2b, the throttling bore 24 overlaps an annular groove 25, which has a sufficient axial extension and is connected with a pressure sink Pt, for example the tank. Between the throttling insert 22 and the low-pressure chamber 5 there is an additional arrangement of second openings 26, which can also be connected with the pressure sink Pt on an accordingly long displacement of the slide 6 under expansion of the low pressure chamber 5. This opportunity serves the purpose of reducing the pressure in the low-pressure chamber 5, when the pressure increase is caused by other influences, for example, in connection with a pressure reduction valve without non-return valve 12 on the outlet, by a pressure increase in the connected hydraulic consumer.

The throttles 23 and 24 are made as sharp-edged apertures. In this case, the pressure drop at the throttles 23, 24 is not particularly temperature dependent. Of course, also other throttle types can be chosen, for example, slot apertures. The throttles 23, 24 should be of the same type, in order that, for example, temperature variations cause the same changes in both throttles. Accordingly, the middle outlet of the pressure divider formed by the throttles 23, 24 always remains at the same pressure level, compared with the relation between the pressure in the low-pressure chamber 5 and at the pressure sink Pt.

The lateral bore 21 is arranged so that it is completely open in any case, that is, also when the slide 6, as shown in FIG. 1, is retracted to the extreme inner position in the housing part 2b.

Figure 2:
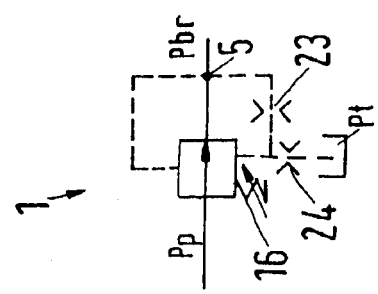
FIG. 2 is a schematic connection diagram of the pressure reduction valve.

FIG. 2 shows a schematic connection diagram of the pressure reduction valve 1, in which the same parts as in FIG. 1 have the same reference numbers. It appears clearly that the side of the slide 6 acted upon by the spring 16 is connected with the middle outlet of the pressure divider formed by the throttles 23, 24. Via the throttles 23, 24, fluid can currently flow off from the low-pressure chamber 5 to the pressure sink Pt. However, this fluid loss can be accepted, because the pressure reduction valve 1 has an excellent dynamic.

Figure 3:
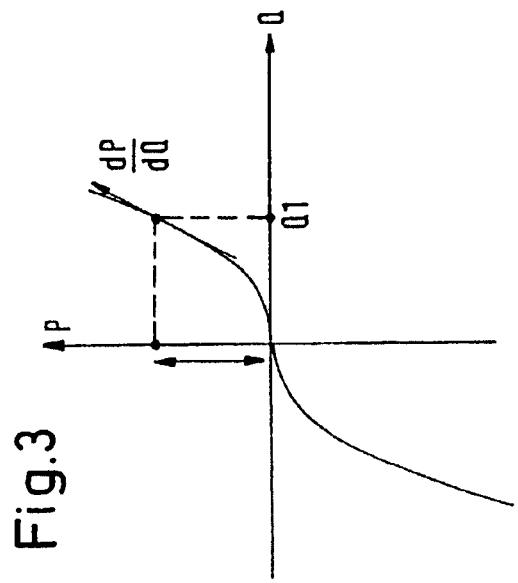
FIG. 3 is a schematic view of the dependency of pressure and flow amount.

This is explained further by means of FIG. 3. Shown to the right is the flow Q. Upwards is shown the pressure drop P over the throttle 24, that is, a share of the pressure loss over the pressure reduction valve 1.

Due to the pilot flow, which flows through the pilot flow channel formed by the axial bore 7, the lateral bore 21 and the throttles 23, 24, the working point of the pressure reduction valve 1 is displaced from the zero point to a point Q1. Here, however, the P-Q nominal line has a larger inclination than in the zero point, so that the value dP/dQ is substantially larger than in the zero point. Thus, the pressure reduction valve 1 reacts to flow changes with a substantially larger pressure change than in the known case.

When dimensioning the spring 16, it has to be considered that now a predetermined pressure rules in the spring chamber 17. For example, a set pressure of 50 bar can be achieved with a spring contribution of 40 bar and a contribution from the pressure drop over the throttle 23 of 10 bar. Thus, the pressure in the spring chamber 17 will also be 10 bar. This static pressure in the spring chamber 17 also has the effect that a cavitation in the spring chamber 17 is avoided, when the slide 6 moves to the right. The pressure reductions observed in the spring chamber 17 until now, no longer occur to the same extent, as fluid can be refilled fast enough through the throttle 23.

Further, the solution shown has the advantage that the design of the slide 6 can be relatively simple. In cases where the low-pressure area only has to be relieved because of a leakage from the high-pressure side Pp into the low-pressure area Pbr (for example when the non-return valve 12 is provided), the pilot flow can be dimensioned so that this leakage can be led to the tank or to the pressure sink Pt. If appropriate, the second opening 26 in the slide can be avoided in this case.

Additionally, the throttle 23 forms a damping device for the moving of the slide 6 in the housing 2a, 2b. Thus, the pressure reduction valve 1 is less inclined to oscillating.

It is therefore seen that this invention will achieve at least all of its stated objectives.

We claim:

1. A pressure reduction valve with a housing, a valve element being displaceable in the housing and acted upon in one direction by a pressure in a low-pressure chamber connected with an outlet and in the opposite direction by the force of a spring, which is arranged in a spring chamber in the housing, characterised in that a pilot flow path connects the low-pressure chamber and the spring chamber with each other wherein the pilot flow path has a branch, which is connected with a pressure sink to establish a current fluid flow to the pressure sink.

2. The valve according to claim 1, characterised in that a throttling device (23) is arranged in the pilot flow path (7, 23, 21).

3. The valve according to claim 2, characterised in that the throttling device (23, 24) forms a pressure divider, with a middle outlet connected with the spring chamber (17).

4. The valve according to claim 1, characterised in that the pilot flow path (7, 23, 21) runs through the valve element (6).

5. The valve according to claim 1, characterised in that the valve element (6) has the form of a slide with an axial bore (7).

6. The valve according to claim 2, characterised in that the throttling device (23, 24) has a throttling opening (24), which is made in a border wall of the axial bore (7).

7. The valve according to claim 6, characterised in that the throttling opening is made as a step bore.

8. The valve according to claim 2, characterised in that the throttling device (23, 24) has a throttling insert (22), which is arranged in the pilot flow path (7, 23, 21).

9. The valve according to claim 2, characterised in that the throttling device (23, 24) has throttles having the same temperature dependency.

10. The valve according to claim 1, characterised in that the pilot flow path (7, 23, 21) has an opening into the spring chamber (17), which is completely open in any position of the valve element (6).

* * * * *